United States Patent [19]

Galan et al.

[11] Patent Number: 5,156,513

[45] Date of Patent: Oct. 20, 1992

[54] APPARATUS FOR HANDLING CLOTHES ON HANGERS

[75] Inventors: Mario A. Galan; Fernando D. Zorita; Juan C. Cristos, all of Madrid, Spain

[73] Assignee: Investronica, S.A., Madrid, Spain

[21] Appl. No.: 770,776

[22] Filed: Oct. 4, 1991

Related U.S. Application Data

[63] Continuation of Ser. No. 325,772, Mar. 20, 1989, abandoned.

[30] Foreign Application Priority Data

Mar. 21, 1988 [EP] European Pat. Off. ........ 88104467.1

[51] Int. Cl.⁵ ............................................. B65G 1/04
[52] U.S. Cl. .................... 414/273; 414/501; 414/750; 414/277; 414/280; 414/281; 414/618; 414/659; 180/168; 364/478; 901/1; 901/16
[58] Field of Search ................ 901/1, 16, 31, 36; 414/273, 277, 661, 659, 279, 281, 225, 226, 282, 331, 222, 467, 501, 276, 735, 750, 751, 752, 753, 618, 619; 180/167, 168; 364/478

[56] References Cited

U.S. PATENT DOCUMENTS

| | | | |
|---|---|---|---|
| 3,272,347 | 9/1966 | Lemelson | 414/735 X |
| 3,415,385 | 12/1968 | Rossello et al. | 211/1.5 |
| 3,464,588 | 9/1969 | Strike et al. | 221/75 |
| 3,495,677 | 2/1970 | Wilson | 414/273 X |
| 3,549,025 | 12/1970 | Messner | 414/282 |
| 3,561,620 | 2/1971 | Willis | 414/282 |
| 3,589,535 | 6/1971 | Reading | 414/273 X |
| 3,770,148 | 11/1973 | Hendren | 414/287 |
| 3,814,026 | 6/1974 | Maloney | 414/277 X |
| 3,854,616 | 12/1974 | Willis et al. | |
| 4,307,988 | 12/1981 | Page et al. | 414/279 X |
| 4,372,728 | 2/1983 | Murakami | 414/735 X |
| 4,411,577 | 10/1983 | Shearer, Jr. | 414/273 X |
| 4,492,504 | 1/1985 | Hainsworth | 414/273 |
| 4,664,590 | 5/1987 | Maekawa | 414/279 X |
| 4,678,390 | 7/1987 | Bonneton et al. | 414/282 |
| 4,679,149 | 7/1987 | Merz | 414/273 X |
| 4,718,810 | 1/1988 | Hoehn et al. | 414/222 X |
| 4,764,078 | 8/1988 | Neri | 414/273 |

FOREIGN PATENT DOCUMENTS

| | | |
|---|---|---|
| 245442 | 2/1966 | Austria . |
| 0005539 | 11/1979 | European Pat. Off. . |
| 0169156 | 1/1986 | European Pat. Off. . |
| 1781310 | 1/1971 | Fed. Rep. of Germany . |
| 2711349 | 9/1978 | Fed. Rep. of Germany ...... 414/273 |
| 3236997 | 4/1984 | Fed. Rep. of Germany ...... 414/281 |
| 0636153 | 12/1978 | U.S.S.R. ............................. 414/267 |
| 2115451 | 9/1985 | United Kingdom . |
| 0302205 | 2/1989 | World Int. Prop. O. .......... 414/279 |

Primary Examiner—Frank E. Werner
Attorney, Agent, or Firm—Kenyon & Kenyon

[57] ABSTRACT

This invention consists of an assembly and apparatus for handling clothes on hangers, and more exactly of an apparatus able of moving clothes or the like from one place to another inside a factory or a warehouse, following instructions that could be provided by an external computer. The apparatus includes basically an auto-guided vehicle, a manipulator of two degrees of freedom and a clamp, movable in four degrees of freedom, being all the aforementioned elements specifically designed for controlled handling clothes on hangers. When applied in a factory, a set of apparatus like this one of the invention, communicated with the proper computer, could automate the operations and the internal management of the warehouse or workshop (FIG. 1).

14 Claims, 9 Drawing Sheets

APPARATUS FOR HANDLING CLOTHES ON HANGERS

This application is a continuation of application Ser. No. 07/325,772 filed Mar. 20, 1989, now abandoned.

TECHNICAL FIELD

The present invention relates to an assembly for programmed controlled handling and transporting objects, garments, clothes or the like.

BACKGROUND OF THE INVENTION

The main object of this invention is the handling of clothes on hangers, and it is more specifically an apparatus able of moving the clothes from one place to another, by example, in a warehouse or workshop following the instructions of a host computer.

The automation of operations in the garment industry follows a slower process than in other industries, because of the deformability of the clothes and suitable for other industries do not fit for handling clothes on hangers. The dimensions, weight, way of fastening of clothes, and the wide scope of size and form of hangers and clothes, state the need for a specific manipulator.

The automation of clothes on hangers warehouses has been developed following two different strategies. One of them deals with the clothes by batches without individual handling and treatment of each cloth, which however, is necessary in all those warehouses in which the order of entry of the clothes is different from the one of exit, as it usually happens. The other strategy is based in the continuous moving of the clothes by means of a transport chain, so we can select the clothes when they pass certain points. This topic of the dynamic-warehouse shows some shortcomings in relation with the number of clothes stocked and the daily flows of exit and entry, specially when they are great. An object of this invention is to solve the problems that arise in the controlled individual handling of clothes, moving only the ones chosen for the daily flow in a warehouse, workshop or the like.

With regard to the automatic transport of clothes or their components between workstations, there are developed systems including a real time production control, automatic balancing of workstations doing the same operation, etc. These transport system basically have a main circuit where the hangers move, and stations where the hangers that move along the main circuit come into, according to a predetermined logic, and return to the main circuit once the related operation is finished, see DE-A-17 81 310.

Being rather fulfilled, from the point of view of what can be required in a nowadays garment factory, these transport systems have a great dependency upon the characteristics of the factory for their installation, they are not quite flexible with respect to future changes in their configuration, and it does not seem easy their application, in their present state, to future robotized workstations. These reasons, among others, have caused in other branches of the industry the application of autoguided vehicles as a medium of transport between workstations. The application of specific clamps for the clothes and their components, designed taking in mind the operations in the workstations and the compatibility with the apparatus of this invention, help to solve the problems arising in the nowday transport system.

The contribution of technologies nowadays extended, like that of autoguided vehicles—see for example AT-PS 24 5442—which can follow defined paths and stop in established points of such paths, and the communication by radio between a host computer and a set of apparatus. The present invention is the first to provide the tool for the automation of the operations for moving the clothes and the management of the information needed for the operations, such as the time and place of stockage and kind of cloth moved.

SUMMARY OF THE INVENTION

The present invention resides in a method and apparatus for picking and moving clothes on hangers, which are placed upon bars, and carrying them to other bars. The apparatus includes a manipulator of two cartesian degrees of freedom, one horizontal and other vertical, for having access to the hangers hanging on the bars which can be placed in a wide range of vertical and horizontal distances from it. Thus, the manipulator moves in four directions of an orthogonal system and the orthogonal system is suitably perpendicular to the longitudinal axis of the vehicle. A clamp is moved with the aforementioned degrees of freedom and collects the hangers, having taken into account in the clamp conception a great variety of clothes and hangers forms.

An autoguided vehicle, as the physical support of the manipulator, provides the ability needed for the displacement in the horizontal plane. A dynamic support for hangers moved by an endless screw provides the storage for carrying more than one hanger at each time.

The control of the necessary movements, according to the method of the invention is done by electronics devices. A system of communication with a host computer allows the exchange of information needed to manage the operations of an apparatus or a set of them.

The assembly further has a manipulator apparatus comprising a system of vertical teleskopic tubes with two external fixed tubes, another intermediate between them, movable and guided longitudinally upon them, and another inner tube to the intermediate, movable and guided longitudinally upon it, the system of movement being formed by a motor which can be controlled in position and which activates a system of transmission of movement such that moves at the same time the inner tube with respect to the intermediate and the intermediate with respect to the two external tubes, and an horizontal tube fixed to the inner vertical tube above mentioned, another horizontal tube movable and longitudinally guided over the fixed horizontal tube and a movable clamp which is guided longitudinally over the movable horizontal tube, the system of movement being formed by a motor which can be controlled in position and which activates a system of transmission of movement such that moves at the movable horizontal tube and this one with respect to the horizontal fixed tube until a certain distance established in both directions from an intermediate position, being then the clamp standing still with respect to the horizontal movable tube while this is moving with respect to the tube yonder than the established distance.

BRIEF DESCRIPTION OF THE DRAWINGS

FIG. 10 shows a bar with the toothed piece clamped on it.

DETAILED DESCRIPTION OF PREFERRED EMBODIMENT

Figure 1:
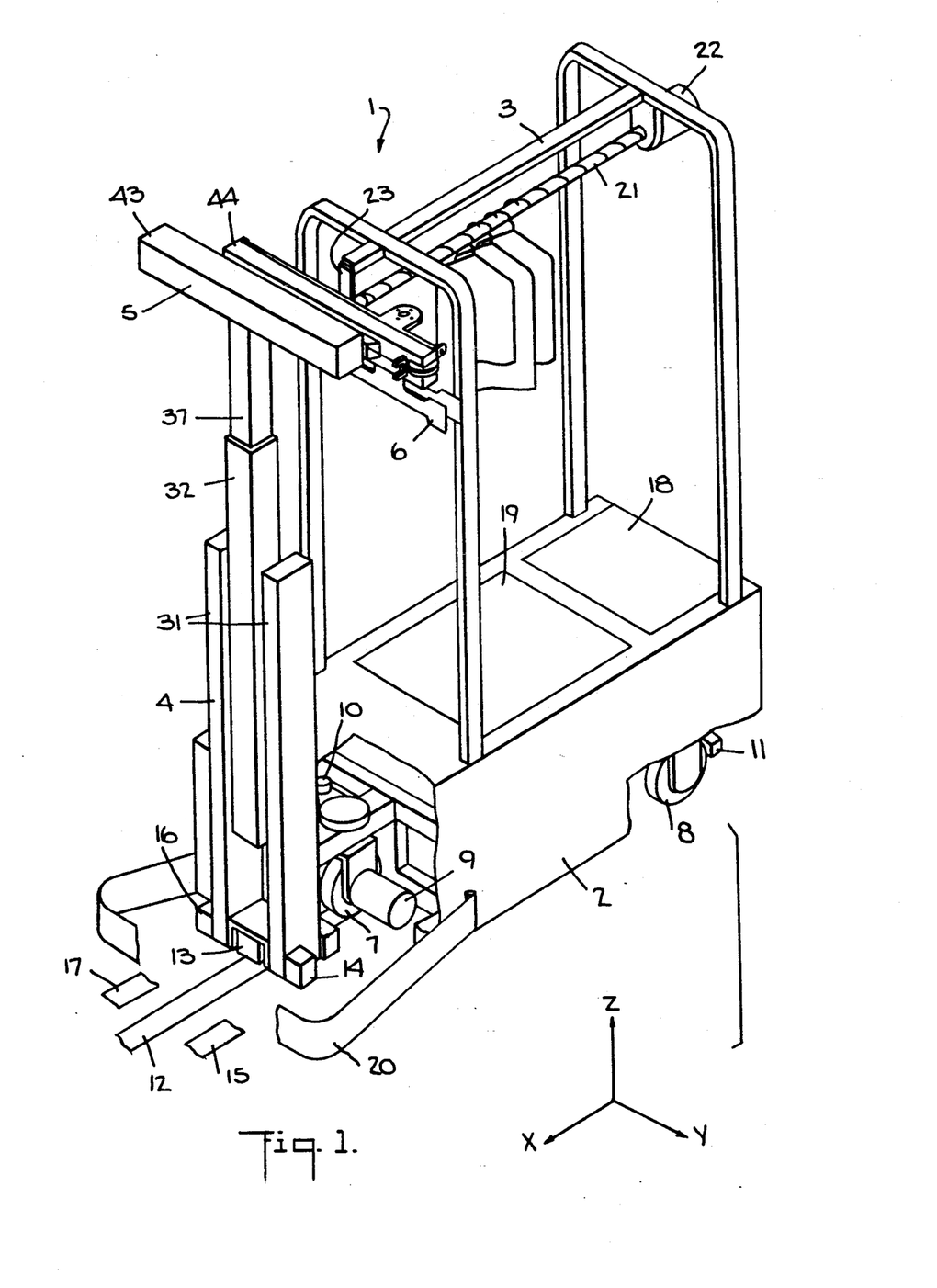
FIG. 1 is a perspective view of an apparatus like that of the present invention, where it may be seen the main parts of the apparatus and the main accessory elements.

In FIG. 1, it can be seen the main parts of the apparatus generally designated as 1, the basic of which is the autoguided vehicle 2, which supports the dynamic support 3 for hangers and an extensible vertical arm 4 that supports another horizontal arm 5, upon which a clamp 6 can move.

The autoguided vehicle stands on three wheels 7 and 8, wheel 7 is in the front, and the two wheels 8 are in the back. The front wheel 7 does the traction and driving function using two DC motors 9 and 10 with reducers, controlled in position by known electronic devices and the computer on board. The traction motor also acts as a brake when the security system is on. The back wheels 8 could also be stopped by the mechanism 11 when activated by the security system. The front wheel 7 stands on a metallic strip 12, of adequate magnetic properties, fixed to the floor of a warehouse or the like with adhesive tape. A sensor 13, placed before the front wheel, detects its relative position with respect to the magnetic strip 12 and gives the signals needed for activating the driving motor, allowing the alignment of the vehicle with the strip. Sensor 14 detects marks 15 on the floor, mainly bits of strip such as 14 of a specific length, which signal a curve or a side tracking at a distance from the mark, see FIG. 9.

Another sensor 16, FIG. 1, similar to 14, detects other marks 17, similar to 15, placed in such a way that divides the circuit in sections of determined length. These sensors and marks can be used to calibrate the traction motor, to know the exact position of the vehicle on the circuit, and as a support for controlling the traffic, for example, preventing a vehicle to come in a section where there is another vehicle.

A communications system between a host computer and the board computer allows the exchange of information between the two computers. The network system consists in a wireless transmitter-receiver, which establish the exchange of information at any place and time within its range of action. The communications system, the board computer and the electronic for the control of motors are placed in a central module 18, in a location that does not interfere with the loading space for clothes. The batteries 19 are placed in a way that does not interfere with the loading area and also can be replaced quickly. The batteries can also have automatic loading.

The aim of the security system is to detect external or internal incidences which affect or could affect the current working of the apparatus, to short circuit all the motors when a fail is detected, in order to enable the motors as brakes, to enable the brake of the back wheels, and also to tell about the fail to the host computer through the communications system. It is a part of the security systems a flexible strip 20 which surrounds the car in its front side and whose strain beyond a certain limit is detected by adequate sensors and then the security system is activated. Similar sensors have the same function near the end of the actuation range for the driving system and the vertical arm 4 and horizontal 5. The motors are provided with encoders, so they can be controlled in position. This allows to enable the security system when there is a lag of phase between the actual position and the ordered one.

Figures 2A, 2B:
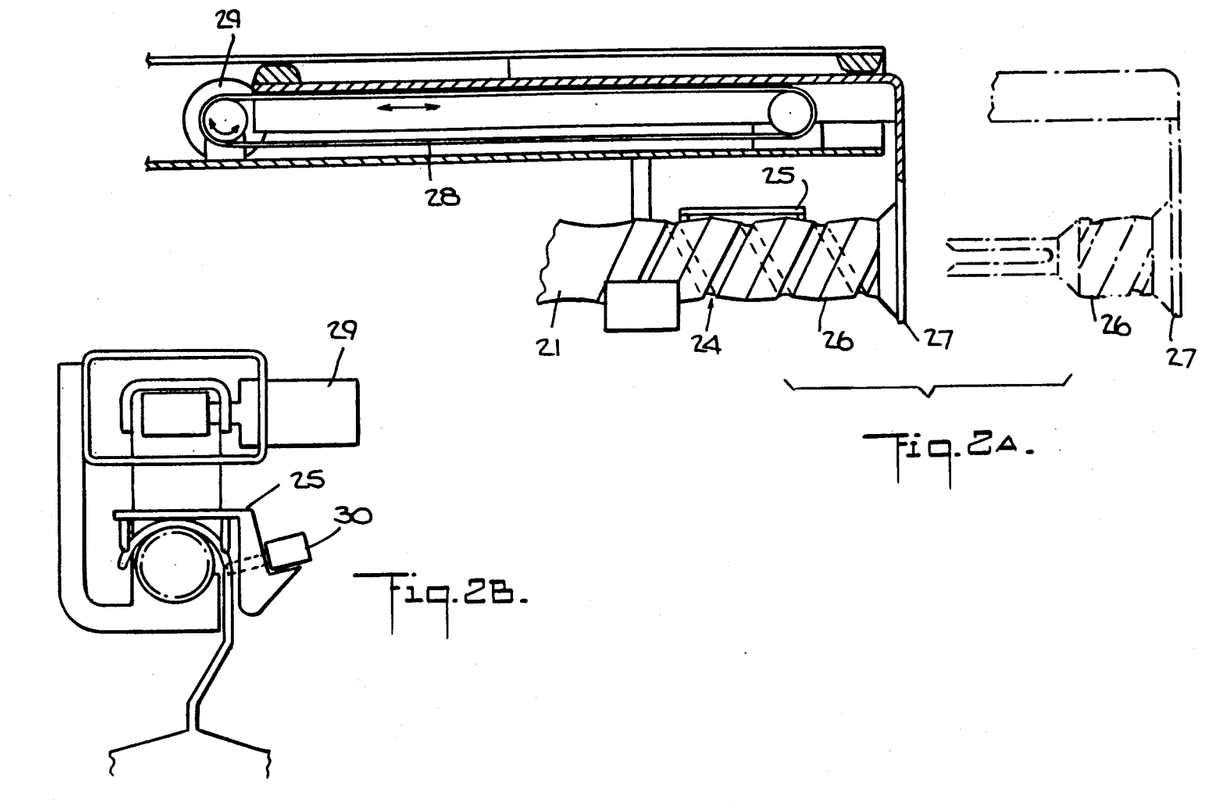
FIGS. 2A and 2B show the hangers loading/unloading mechanism of the dynamic support of this invention.

The dynamic support of hangers 3 affords the storage of a certain number of hangers. It is an endless screw 21 placed at the required height above the car and standing on it so it creates the entry and exit of hangers by the front part of the car. The endless screw is enabled by a DC motor 22 so it can rotate in one direction or the opposite following the instructions of the board computer. The hangers are then moved or brought by the endless screw from the loading/unloading mechanism 23 placed in the front of the screw (see FIG. 2), where the hangers are separated at a distance equal or higher than the pitch or step of the screw. This function is done by means of a helicoidal slot 24 having the same pitch than the endless screw whose depth is equal to the diameter of the hanger hook and a rigid fixed part 25 almost tangents to the endless screw. In this way, two hangers can not pass consecutively at a shorter distance than a step of the screw. The mechanism of loading/unloading consists in a screw 26 similar to 21, but its length is approximately a step, and in which the helicoidal slot 24 is lengthened. The screw 26 is guided in the inside of screw 21, so screw 26 can move straightly from 25, but they rotate together. In the other side, the screw 26 is hinged to support 27 which by means of belt 28 can move straightly when activated by DC motor 29.

The function of the mechanism for loading/unloading is to facilitate the splitting of the hanger ready for loading/unloading from the ones on the screw shaft, so that the hangers and the mechanism do not interfere with clamp 6 when moved. A sensor of hangers, preferably a micro switch 30, detects the pass of a hanger from the mechanism of loading/unloading to the splitter of hangers and viceversa, and the signal is managed by the board computer in order to enable or inhibit motors 22 and 29 and the motor of arms 4 and 5.

Figure 3:
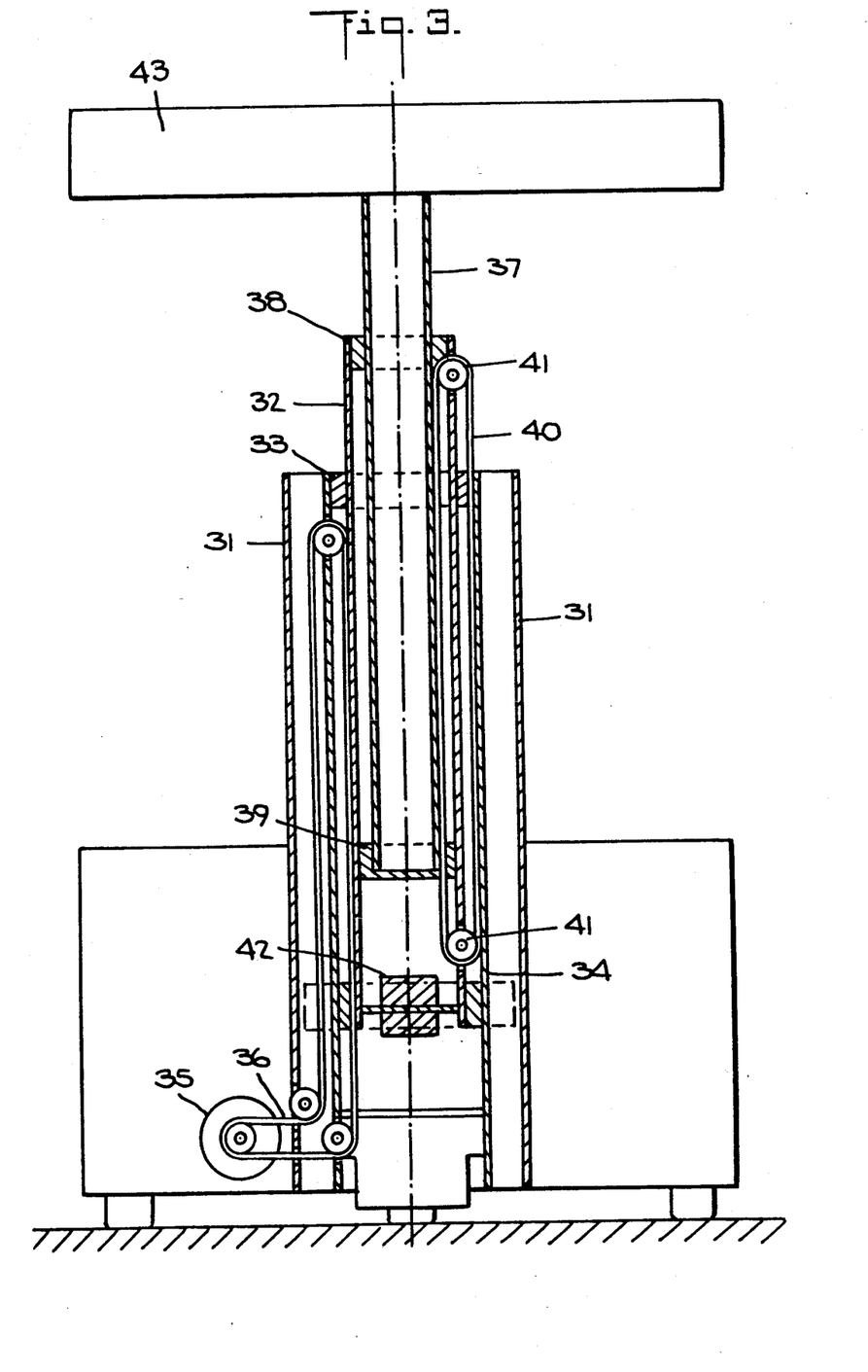
FIG. 3 shows schematically the extensible vertical arm and its system of movement.

The two tubes 31 are fixed parts of the extensible vertical arm 4 (see FIG. 3). Tube 32 slides within tubes 31, supported by guides 33, which are fixed on the top part of tubes 31, and on guides 34, fixed to the bottom of tube 32. The movement of tube 32 is done by means of motor 35 controlled in position, using a synchronous belt 36 fixed to tube 32. The inside tube 37 slides in tube 32 supported by guides 38, fixed to the top part of tube 32, and on guides 39, fixed to the bottom of tube 37. The movement of tube 37 with respect to the fixed tubes 31 is provided for by the belt 40 and two pulleys 41 fixed to tube 32. In this way tube 37 moves with respect to tube 32 when this one moves with respect to tubes 31, see FIG. 3.

Two micro switches fixed to tubes 31 detect whenever tube 32 overranges its maximum stroke by both sides and act in consequence over the security system. Shock absorbers 42 damp the possible crash if the security system fails.

Figure 4:
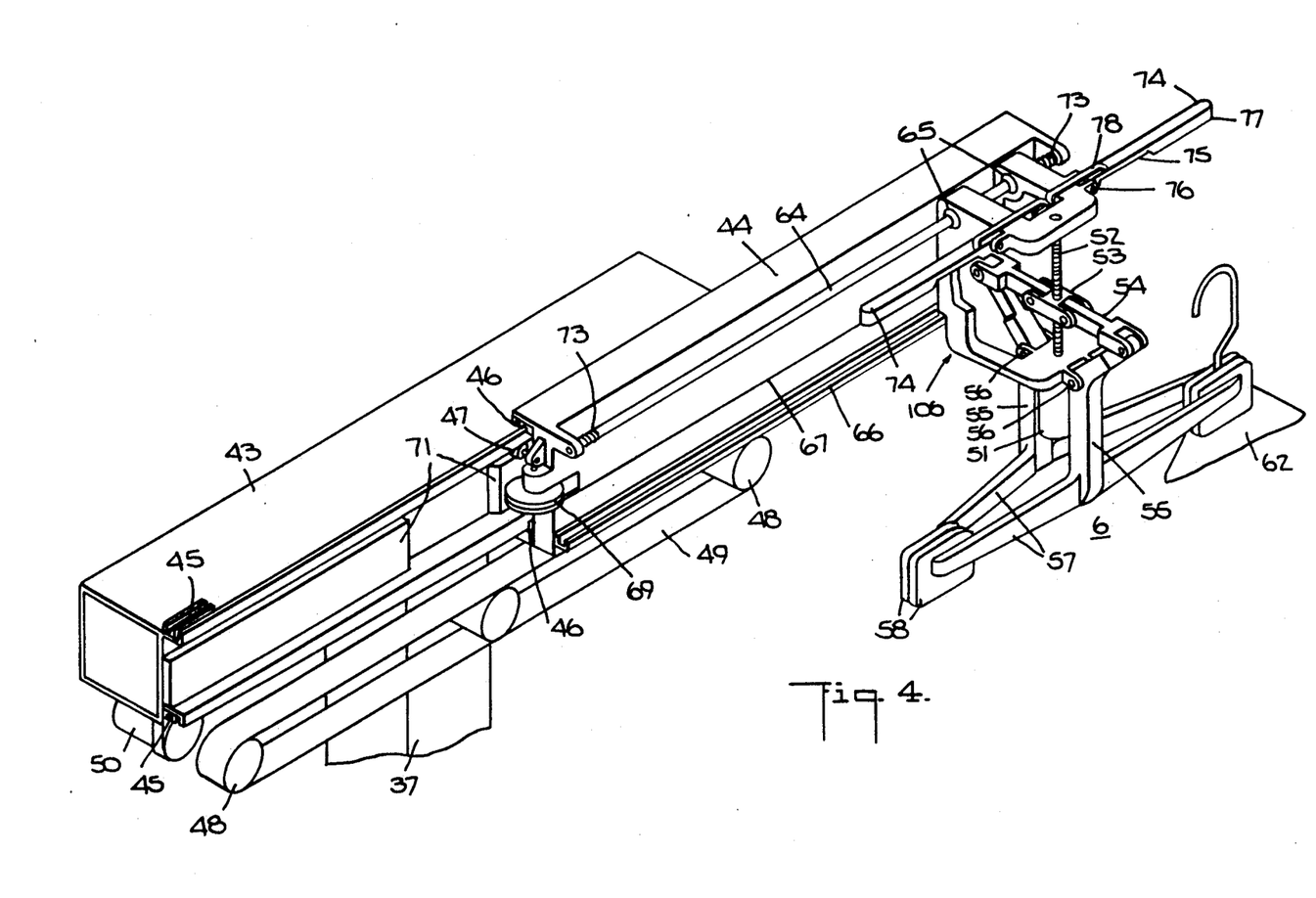
FIG. 4 is a perspective view of the extensible horizontal arm with the clamp positioned on an end of the movable arm.

An horizontal tube 43 fixed to the inner movable vertical tube 37 supports the movable horizontal tube 44 by way of different guides and supports, following the relative position between them (see FIGS. 1 and 4). Guides 45 are fixed to tube 43 on both sides on top and bottom parts, such as guides 46 are fixed to tube 44. These guides equilibrate the horizontal loads and torques around the vertical and horizontal longitudinal axis on the horizontal tubes. The vertical load and moment around the horizontal axis, longitudinal of the car, are equilibrated by means of rollers 47 fixed to both ends of tube 44 and pulleys 48 fixed to both ends of tube 43.

A synchronous belt 49, external and internally toothed, is mounted between pulleys 48 and interlocks with the bottom part of tube 44, properly mechanized. One of the pulleys 48 is fixed to motor 50 controlled in position, guiding the movement and its control of tube 44 along the tube 43 in a wide range of positions in both ways. Two micro switches fixed to tube 43 in both ends detect if tube 44 over-ranges its maximum stroke by both sides and act in consequence over the security system.

Clamp 6 consists of a mechanism of articulated bars activated by a DC motor 51, mounted on a U-shaped frame 106 of the clamp. The motor enables a screwed axis 52 to rotate with respect to a screwed piece 53 that, unabled to rotate by the biforcated bars 54, moves all over the length of the screwed axis. The motor is turned on by the on board computer when the operation sequence requires it, and turned off also by the computer when the piece 53 arrives to the other end of its stroke. The arriving signal can be given by a micro switch, see FIG. 4.

Two levers 55, supported on axis 56 on the frame 106 with respect to them they can swing, and are hinged by their extreme end to bars 54 and so they are fixed stiffly. Two other symmetrical arms 57 are connected to their center to the other extreme end of the levers 55 an do with their clamp pieces 58 on their ends the function of clamping. In this way garments can be handled by the left or the right of the apparatus. Clamp pieces 58, of direct contact with the hangers are of a material with a high friction coefficient and high deformability and elasticity to compression like some elastomers and foams, and they are conformed for splitting the area of fastening away from the center of clamping, so they can improve their efficiency, FIG. 4.

Figure 5:
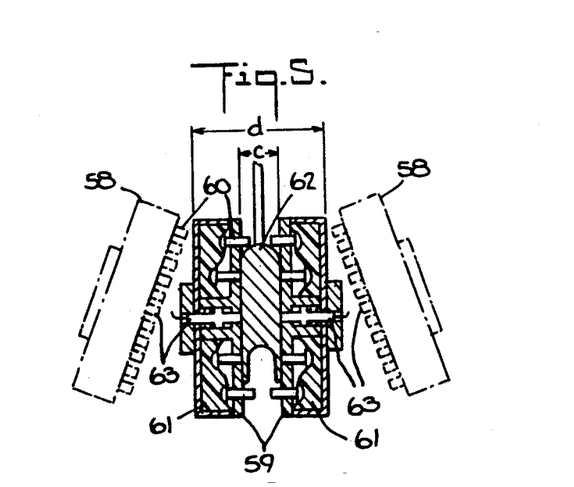
FIG. 5 shows a drawing of the clamp fingers in open position and a cross section of them clamping a hanger.

Another preferred solution for clamp pieces 58 includes a high number of retractable pins 60 (see FIG. 5) uniformly distributed over the fastening surface 59. The pins are pushed by a piece 61 made out of a material of high deformability and elasticity to compression like foams. In this way the pins adapt to the external shape of the hanger 62 and withstand the hanger weight not by friction, but by bending and shear. Other pins 63 placed front to front and centered on every clamp piece 58 allow the flow of an electric current when they contact: in this way it can be known whenever a hanger is picked by the left or by the right.

Figure 6:
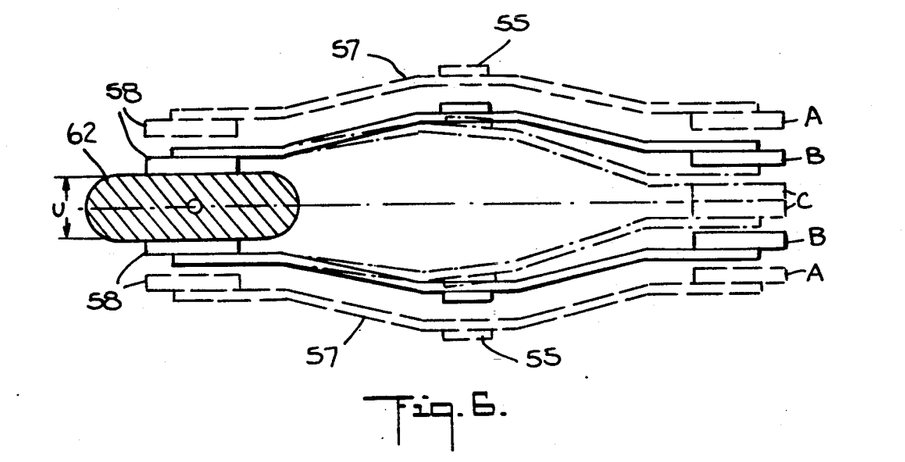
FIG. 6 is a schematic plan view of a sequence of positions of the clamping operation.

FIG. 6 shows three singular positions of the clamping operation. Position A is that of the maximum clamping opening, and corresponds to the top position of piece 53. Position B is that of contact between clamp pieces 58 and hanger 62 and corresponds to an intermediate and variably position of piece 53, according to the width c of the hanger. Position C is that of clamping, and corresponds to the lower position of piece 53, when bars 54 form an angle of 180 degrees. In this position the maximum clamping pressure is reached for a determined maximum torque given by the motor 51. The torque stiffness of bars 55 and bending stiffness of arms 57 are related between them and with the possible hanger width c in order to reach the position C with a minimum clamping pressure and a given maximum motor torque.

For a maximum clamp opening d a maximum admissible positioning tolerance is obtained $$DX = \frac{d - c}{2}$$

that must be bigger than the sum of measures tolerances, ground defects, structural strains . . . etc.

Figure 7A:
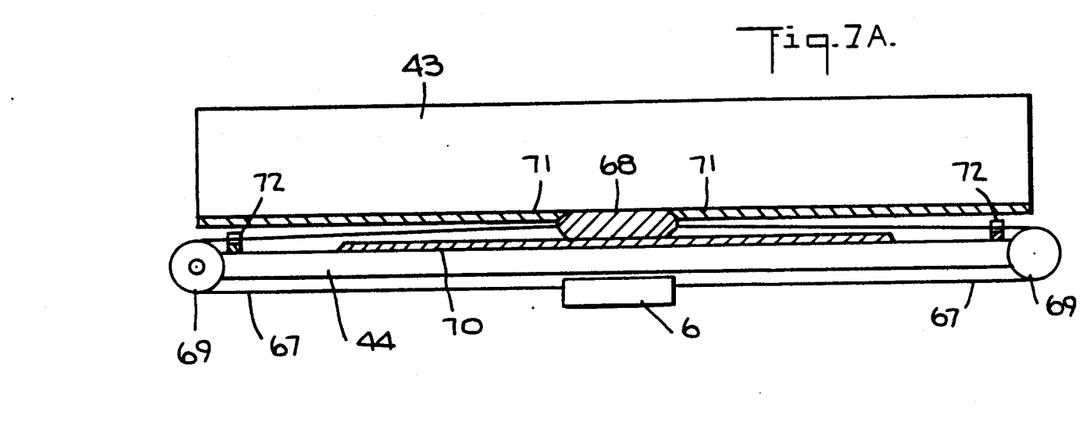
FIGS. 7A and 7B are a schematic plan view of the horizontal movement system of the clamp.
Figure 7B:
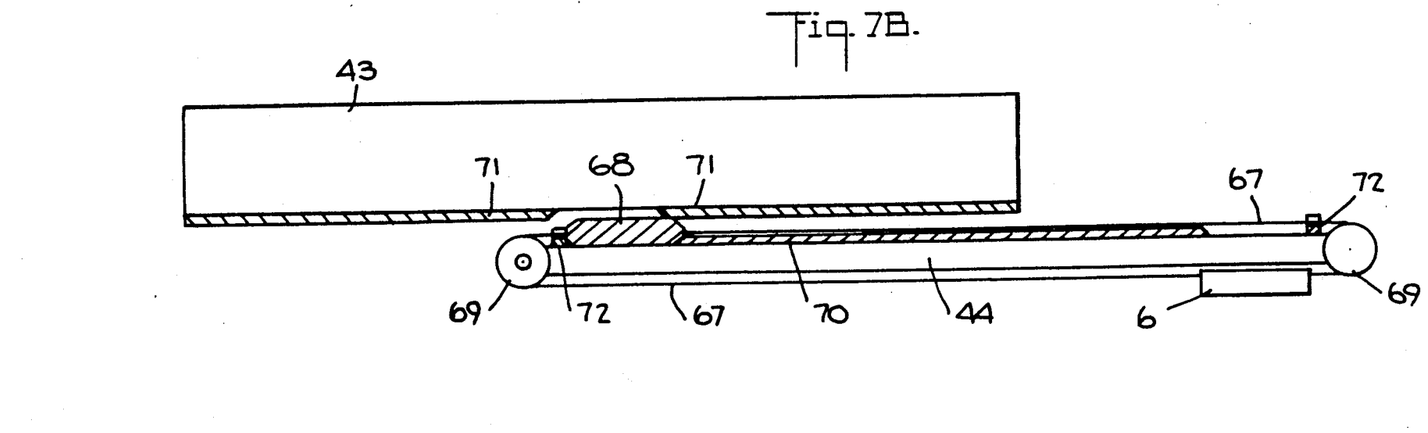

The clamp 6 can slide along axis 64, which is fixed to the movable horizontal tube 44 (see FIG. 4) by way of the two linear bearings 65 of low coefficient of friction, placed on the top part of the frame 106 of the clamp. The equilibrium of the clamp is completed supporting its bottom part on guide 66, that is also fixed to the horizontal movable tube. Two cables 67 of the same length (see FIG. 7) join the clamp to a piece 68 surrounding the horizontal movable tube by pulleys 69. Piece 68 can slide along guide 70, fixed to the movable horizontal tube 44, when it is placed in the proper lap which has in its central part the guide 71, which is fixed to the horizontal fixed tube 43, or it can slide along guide 71 when it is placed in one of the two fitted slots which has in its extremes the guide 70. When the clamp is centered on the horizontal movable tube, piece 68 is placed on guide 71; see FIG. 7A. In this way, if the movable horizontal tube moves, piece 68 will be fixed, and for this reason, by means of cables 67, the clamp moves with respect to the movable tube 44 such as this one moves with respect to 43 and in the same direction. So then, when piece 68 is placed on guide 71, the displacements, velocities and accelerations of the clamp are twice of those of the horizontal movable tube.

Carrying on with the movement, at some time the slot of one of the extremes of guide 70 will be front to front to piece 68. At that moment, a butt 72 fixed to the horizontal movable tube collides with piece 68 and forces it to exit from the slot on guide 71 and to come in the slot of guide 70; see FIG. 7B. From this moment, piece 68 is fixed to the movable horizontal tube 44, and for this reason there is not relative movement between this one and the clamp. Resuming, while piece 68 is placed in some of the slots of guide 70, the movement of the clamp is the same as that of the horizontal movable tube.

One of the springs 73 which are placed on the axis guide 64 is compressed by the clamp and then tightens cable which goes by the pulley 69 nearest to the clamp. The effect of this tightness and the angle which has the other cable with piece 68, give the necessary loads for getting out this one from its placement on guide 70 and getting into the placement of guide 71, when both slots are front to front during the return of the movable horizontal tube to the centered position.

Figure 8A:
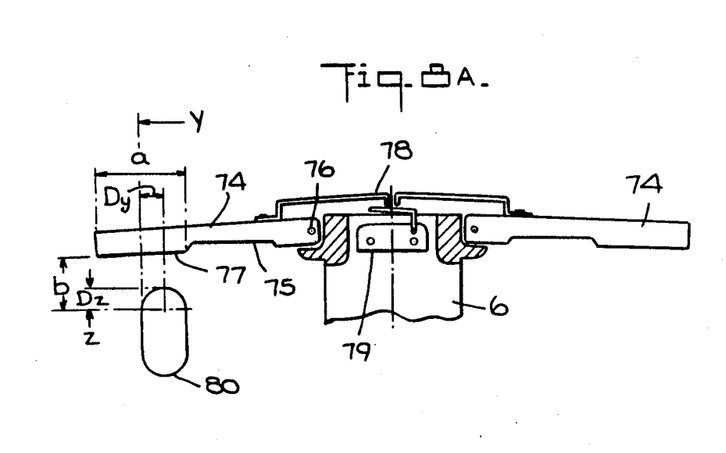
FIGS. 8A to 8D show schematically a sequence of positions during the operation to stablish the relative position between a bar and the clamp.
Figure 8B:
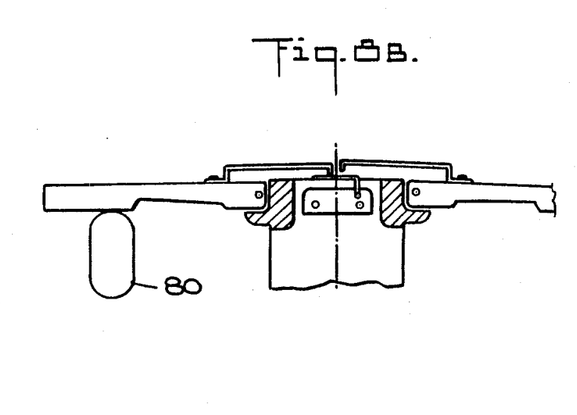
Figure 8C:
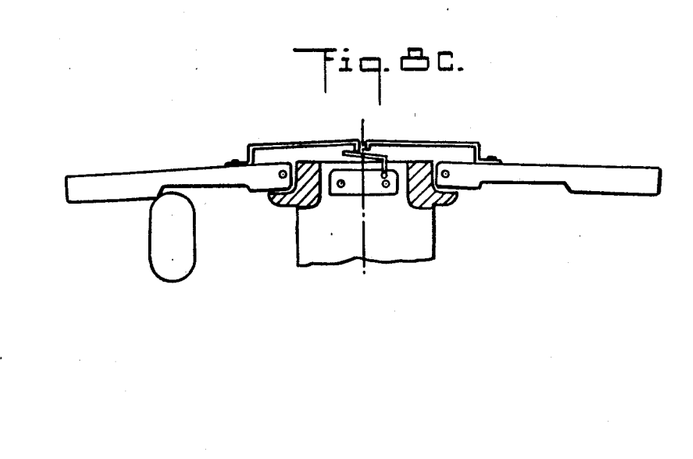
Figure 8D:
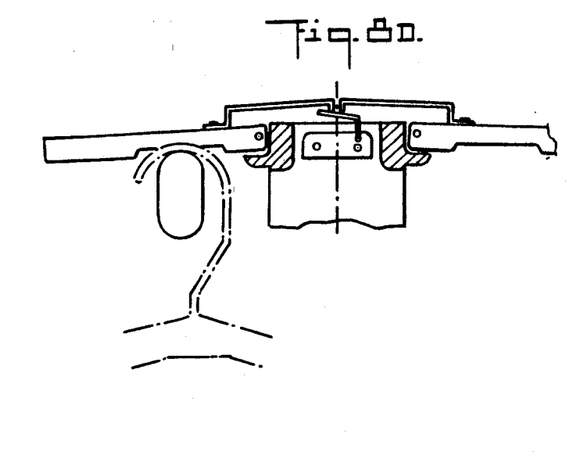

Two tracers 74 hinged to the frame of the clamp 6 detect the actual position of the hanging bars with respect to the clamp, whether such bar is to the left or to the right of the apparatus. The tracer consists in a hinged bar (see FIGS. 4 and 8) whose lower part includes, near the hinge 76, a zone 75 which is horizontal while the tracer is in normal position, and other zone 77, through the free end, which is slightly inclined while the tracer is in normal position. There is a flat spring 78 stiffly joined to the top part of the tracer that acts on a detector, for example a micro switch 79, when the zone 77 tilt to horizontal. The micro switch 79 is placed in such a way that can be acted by any of both tracers. The way of detection of the actual relative position between a bar 80 and the clamp is as follows: being Y and Z the theoric horizontal and vertical distances (previously measured) from the bar to the metallic band that guides the apparatures, the first operation would be placing the clamp, by means of extensible horizontal and vertical arms, in such a way that the mean point of zone 77 (whose length is a) is at an horizontal distance Y from the vertical axis of the apparatus and at a vertical distance $Z+b$ from the floor. There will be, in general, a difference between theoric and actual relative positions between the bar and clamp due to tolerance in measures, defects on the floor, structural strains, etc. . . . Therefore, the sum of maximum admissible errors to place the zone 77 above the bar will be $DY=a/2$ and $DZ=b$ (see FIG. 8). The second operation would be a vertical movement, AB (FIGS. 8A and 8B), until the micro switch 79 is activated, after the bar 80 has come in contact with zone 77. The third operation would be an horizontal movement, BC (FIGS. 8B and 8C), until the micro switch 79 is disactivated, after the zone 77 leaves the top line of bar 80. In that moment the actual relative position between the bar and clamp is known, and the following movement, sequence CD, (FIG. 8C and 8D), will lie in that a hanger is to picked or released, on the left or on the right.

The dimensions and relative positions between the left and right tracer and the pieces 58 are deduced from the dimensions of the hanging bar cross section and the hanger hook, taking into account the possibility of picking and releasing passing the hanger hook unter and above the bars.

With the afore discribed elements, it can be executed a method for handling garments hanging on hangers that are hanged on bars, as it is described now talking as example of application a warehouse of garments hanging on hangers.

Figures 9, 10A, 10B:
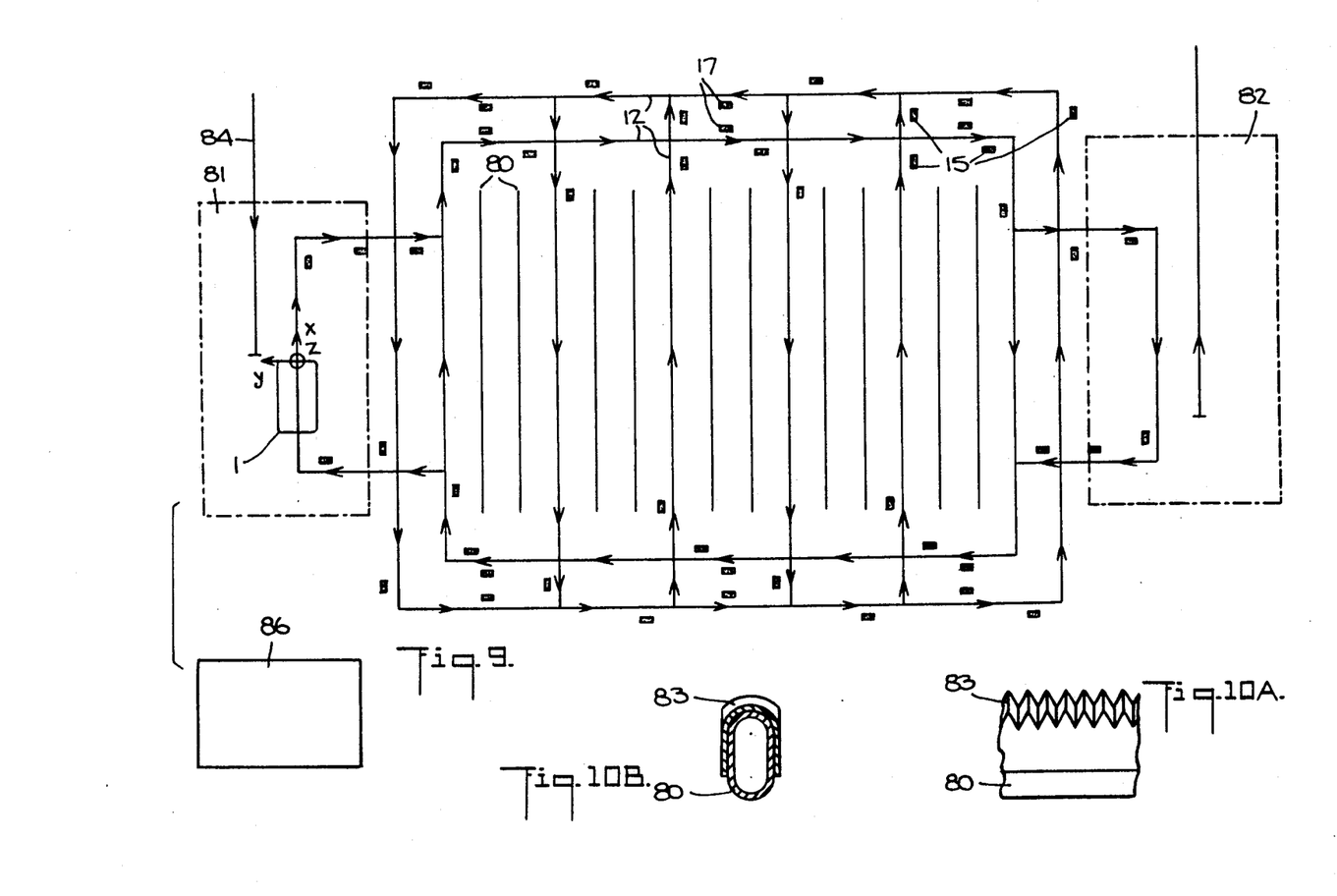
FIG. 9 is a schematic plan view of a warehouse for clothes on hangers which can be managed by one or several apparatus like that of the present invention.

In FIG. 9, which shows a warehouse of this kind, it can be seen the disposition of the bars 80, the magnetic tapes 12 which guide the vehicle, the marks 15 which signal a curve or a side-track, and the marks 17 which signal a determined position. There is an entry area where the garments come from the exterior and are picked by the apparatus in a known order. There is an exit area 82 where the garments are carried by the apparatus in a established order. The bars are mechanized in a way that its top arista has toothed form, for avoiding the swing of the hangers with respect to its vertical axis when they are hanging. This function could be executed preferably by plastic pieces 83 which are clamped upon the bars (see FIG. 10). A host computer knows the placing of the magnetic tape 12 in the warehouse, and also the vertical and horizontal distance of the bars with respect to the magnetic tapes as stored in its memory.

Figure 11:
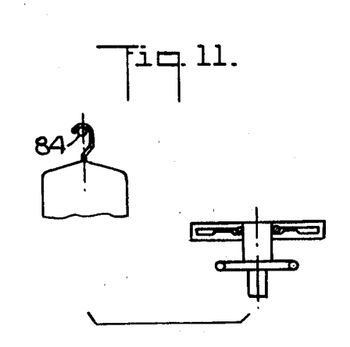
FIGS. 11O to 11I show schematically a sequence of positions during the operation of removing a hanger from a bar or an endless screw and loading it in the apparatus.
Figure 11A:
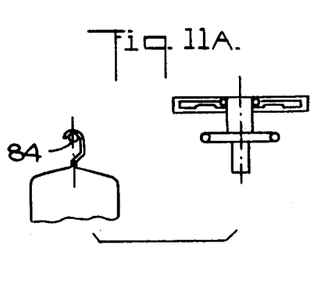
Figure 11B:
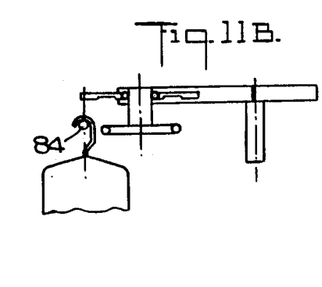
Figure 11C:
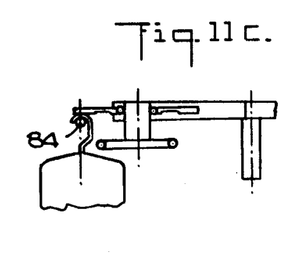
Figure 11D:
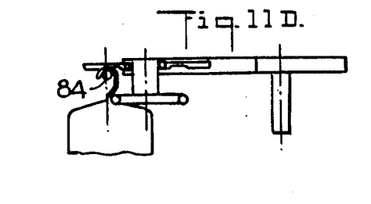
Figure 11E:
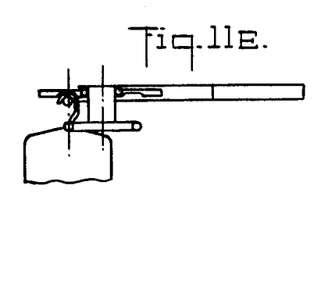
Figure 11F:
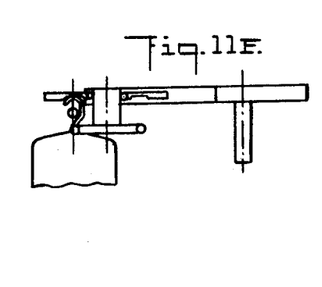
Figure 11G:
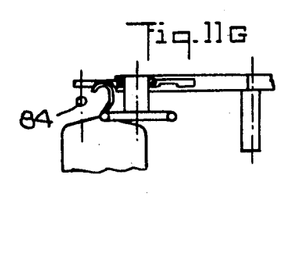
Figure 11H:
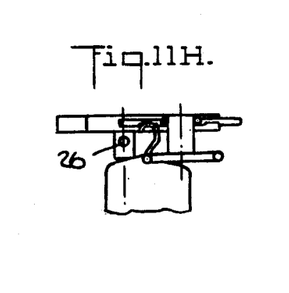
Figure 11I:
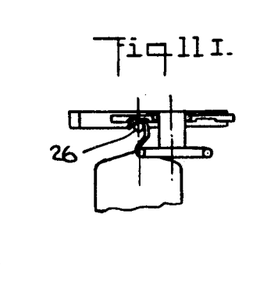

The hangers can arrive to the entry area using an endless screw, with the proper mechanisms needed for the apparatus to collect the clothes always in the same position. In a disposition like that of FIG. 9 the apparatus 1 will be placed in such a way that the hangers will be placed towards the axis $+Y$. Once the apparatus is correctly placed in position with respect to the hanger in X by the traction motor, the following movements will be executed (see FIG. 11).

Movement from position O to A: the clamp moves in the vertical in such a way that the tracer 74 is higher than the endless screw 84 which moves the clothes into the entry area.

Movement from position A to B: the clamp moves in horizontal until the tracer 74 is placed centered in the theoretical vertical position of the endless screw 84.

Movement from position B to C: the clamp goes down until the tracer touches the endless screw and then the vertical relative position is detected.

Movement from position C to D: the clamp moves along the horizontal until the step of the tracer slides over the endless screw: at that moment it is known the true relative position of the endless screw with respect to the apparatus, and in consequence, the true position of the hanger.

Movement from position D to E: the clamp is placed in the clamping point of the hanger, being enabled afterwards motor 51 until it is enabled the lower micro switch which signals that the clamping is done. The existence of a clamped hanger is sensed by contacts 63.

Movement from position E to F: the clamp moves in vertical until the hanger hook can move in horizontal from position F to G without interfering with the endless screw.

Movement from position G to H: the clamp moves in horizontal and vertical till placing the hanger hook near the loading/unloading endless screw 26, being this one enabled afterwards.

Movement from position H to I: the clamp moves in horizontal and vertical until leaving the hook in position for unclamping, which is then done enabling motor 51 till top micro switch is enabled.

Movement from position I to H: the clamp does the inverse movement to the afore mentioned being then enabled the mechanism for loading/unloading and the endless screw 21. Micro switch 30 detects the passing of the hanger and gives the signal for stopping the endless screw.

Movement from position H to O: the clamp returns to the initial position, or from position H to A, and the cycle is repeated for picking another hanger.

When the unloading of the hangers is done, the apparatus gets them into the warehouse and stores them in a prefixed order commanded by the host computer. The apparatus reaches each store position following marks 15 which indicate the correct path, marks 17 which indicate determined positions that can be taken as new origins, and the traction motor controlled in position. When the hanger is to be hanged on a bar placed with respect to the apparatus towards $+Y$ axis, the operations are similar, but in an approximately inverse sequence to those described above. If the bar is placed towards $-Y$ axis, the operations for picking from the bar or hanging upon the bar are also similar to those described above except that the hanger must go under the bar.

The loading of the apparatus from the bars, and its unloading over the endless screw or bar in the exit area are executed in a similar way to the aforementioned.

The apparatus and the handling method described before could be also applicated in a garment workshop. This would require an adequate design of the clamping elements for the clothes and its components that eased the handling of them in the workstations depending upon the different operations and that were compatible with the method and the apparatus described here. For this application will be valuable to have as dynamic support of the hangers, instead of the endless screw system described before, another system which can allow the direct access to any of the hangers on board of the apparatus, such as a chain in a closed loop where hang the clamping units for garments and components.

It should be understood that the foregoing embodiment of the present invention is merely exemplary and the preferred practice of the present invention and that various hangers and modifications may be made in the arrangements and detail of construction of the embodiment described herein without departing from the spirit and scope of the present invention.

What is claimed is:

1. An assembly for programmed, controlled handling and transporting of objects comprising at least one driverless vehicle, a guidance system for said driverless vehicle, manipulator means connected to said driverless vehicle, said manipulator means including gripping means and means for actuating said gripping means from an open to a closed position and vice versa for respectively grasping and releasing said objects, said gripping means being shiftable in four directions of an orthogonal system, storage means mounted on said vehicle for holding objects to be grasped by said gripping means and for receiving objects released by said gripping means, wireless communication means for providing communication between said driverless vehicle and a host computer, and on board computer means for selectively controlling said driverless vehicle, said manipulator means, and said storage means;

said manipulator means comprising a system of vertical telescopic tubes including an upper tube telescopically movable within at least one lower tube, means for moving at least said upper vertical telescopic tube in upward and downward directions, a fixed horizontally oriented tube fixedly mounted to the upper vertical telescopic tube at a position between a first end and a second end of said fixed horizontally oriented tube;

a movable horizontal tube movably mounted on said fixed horizontal tube in parallel relationship thereto, means for moving said movable horizontal tube longitudinally between the first end and second end of said fixed horizontal tube;

said gripping means being movably mounted by mounting and moving means on said movable horizontal tube for movement parallel thereto.

2. An assembly according to claim 1 which further includes:

means for moving said gripping means on said movable horizontal tube simultaneously with and same directionally with movement of said movable horizontal tube selectively toward either end of said fixed horizontal tube until said movable horizontal tube reaches a selected position with respect to each end of said fixed horizontal tube, wherein when said movable horizontal tube reaches said selected position, said gripping means ceases movement with respect to said movable horizontal tube, with said gripping means continuing to move with respect to said fixed horizontal tube due to movement of said movable horizontal tube with respect to said fixed horizontal tube.

3. An assembly according to claim 2 wherein said means for moving said gripping means comprises:

a longitudinal guide mounted on said movable horizontal tube, said longitudinal guide having a recess for receiving a connector piece, said recess being located near each of a first end and a second end of said movable horizontal tube;

cable means mounted on and extending along said movable horizontal tube, said cable means being connected to said connector piece and said gripping means;

a longitudinal guide mounted on said fixed horizontal tube having a recess intermediate the ends thereof for receiving said connector piece;

wherein when said connector piece is received by said recess of said longitudinal guide of said fixed horizontal tube, said connector piece slides on said longitudinal guide of said movable horizontal tube during movement of said movable horizontal tube causing movement of said cable means with respect to said movable horizontal tube and thereby movement of said gripping means with respect to said movable longitudinal tube; and wherein when said connector piece is received by said recess of said longitudinal guide of said movable horizontal tube, said connector piece slides on said longitudinal guide of said fixed horizontal tube during movement of said movable horizontal tube, said cable means remains stationary with respect to said movable horizontal tube and thereby said gripping means remains stationary with respect to said movable horizontal tube.

4. An assembly according to claim 2 wherein said gripping means comprises:

two elongated arm members facing one another with each arm member having a first end and an opposite second end;

mounting and moving means located on said gripping means for mounting each elongated arm member horizontally and parallel to said fixed horizontal tube and for moving said two elongated arm members toward and away from one another;

a clamping member mounted on the first end and the second end of each elongated arm member, with the clamping members at the first ends being positioned opposed to one another to define a first clamp, and the clamping members located at the second ends being positioned opposed to one another to define a second clamp;

each clamping member having a clamping wall with the clamping walls of opposed clamping members facing one another;

a plurality of pins protruding through the clamping wall of each clamping member with each pin having a longitudinal axis, a first end facing the clamping wall of the opposed clamping member, and a second opposite end, means mounting said protruding pins in respective clamping walls, said means mounting said protruding pins permitting forward and backward movement of each pin parallel to its longitudinal axis;

elastic means mounted in each clamping member in contact with the second end of said pins protruding through the clamping wall of the respective clamping member, said elastic means providing for said forward and backward movement of pins responsive to pressure on the first end of pins.

5. An assembly according to claim 4 wherein said gripping means further includes:

a vertically oriented threaded shaft having a longitudinal axis;

means for rotatably mounting said threaded shaft in said gripping means;

motor means mounted in said gripping means and connected to said threaded shaft for selectively rotating said threaded shaft clockwise and counterclockwise;

a support piece having a threaded bore and a first end and an opposite second end, said support piece mounted on said threaded shaft by said support piece threaded bore receiving said threaded shaft whereby said support piece selectively moves upward and downward on said threaded shaft responsive to selective rotation of said threaded shaft;

first lever means having one end connected to a first of said two elongated arm members between the first end and the second end of said first elongated arm member, and said first lever means having another end connected to the first end of said support piece having the threaded bore;

second lever means having one end connected to a second of said two elongated arm members between the first end and the second end of said second elongated arm member, and said second lever means having another end connected to the second end of said support piece having the threaded bore; whereby said first and second lever means selectively move said first and second elongation arm members toward and away from one another responsive to selective upward and downward movement of said support piece on said threaded shaft.

6. An assembly according to claim 1 wherein said gripping means comprises:

a clamp having a frame;

tracer means mounted on two sides of said frame, each tracer means extending parallel to said fixed and movable horizontal tubes, each tracer means having means for detecting an actual position of a storage bar for hangers with respect to said clamp by contact of said tracer means with said storage bar.

7. An assembly according to claim 1 wherein said objects comprise garments hanging on hangers and wherein said storage means comprises a dynamic support means for collecting and moving garments hanging on hangers received from said gripping means and for moving garments hanging on hangers to said gripping means to be picked up by said gripping means.

8. An assembly according to claim 1 wherein said objects comprise garments hanging on hangers, said assembly further includes a storage bar separate from said driverless vehicle for holding garments hanging on hangers, and said manipulator means includes means for removing hangers from said separate bar wherein said hangers hang at a predetermined location on said separate bar and means for placing hangers on said separate bar at a predetermined location.

9. An assembly according to claim 1 wherein said objects comprise garments hanging on hangers and said assembly further includes storage bars separate from said driverless vehicle for holding garments hanging on hangers, said separate bars having mounted thereon toothed longitudinal pieces for inhibiting spinning of hangers.

10. An assembly according to claim 1 further comprising a security system having sensors for monitoring faults, said security system having means for shorting motor circuits responsive to monitored faults.

11. An assembly according to claim 1 wherein said objects are garments hanging on hangers.

12. An assembly according to claim 11 wherein each hanger has a hook portion and an area under said hook portion and said gripping means grips the hanger in said area under said hook portion.

13. An assembly for programmed, controlled handling and transporting of objects comprising at least one driverless vehicle, a guidance system for said driverless vehicle, manipulator means connected to said driverless vehicle, said manipulator means including gripping means and means for actuating said gripping means from an open to a closed position and vice versa for respectively grasping and releasing said objects, said gripping means being supported on support means and being shiftable in four directions of an orthogonal system by moving means, storage means mounted on said vehicle for relinquishing objects to be grasped by said gripping means and for receiving objects released by said gripping means, wireless communication means for providing communication between said driverless vehicle and a host computer, and on board computer means for selectively controlling said driverless vehicle, said manipulator means, and said storage means;

wherein said objects are garments hanging on hangers and said gripping means includes means for selectively gripping and releasing a selected hanger having a garment hanging thereon.

14. An assembly according to claim 13 wherein each hanger has a hook portion and an area under said hook portion and said gripping means grips the hanger under said hook portion.

* * * * *